United States Patent
Jang et al.

(10) Patent No.: US 7,835,525 B2
(45) Date of Patent: Nov. 16, 2010

(54) CRYPTOGRAPHIC METHOD USING DUAL ENCRYPTION KEYS AND A WIRELESS LOCAL AREA NETWORK (LAN) SYSTEM THEREFOR

(75) Inventors: Kyung-hun Jang, Suwon (KR); Jong-ae Park, Yongin (KR); In-sun Lee, Seoul (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 1100 days.

(21) Appl. No.: 10/613,125

(22) Filed: Jul. 7, 2003

(65) Prior Publication Data

US 2004/0005058 A1    Jan. 8, 2004

(30) Foreign Application Priority Data

Jul. 6, 2002    (KR) ................. 10-2002-0039156

(51) Int. Cl.
 *H04K 1/00* (2006.01)
(52) U.S. Cl. .................. 380/270; 380/277; 455/3.01; 455/463; 713/176
(58) Field of Classification Search .......... 713/176, 713/171; 380/270, 277, 278; 455/3.01, 463; 370/260
 See application file for complete search history.

(56) References Cited

U.S. PATENT DOCUMENTS

| | | | | |
|---|---|---|---|---|
| 5,241,599 | A * | 8/1993 | Bellovin et al. ............ | 713/171 |
| 6,195,751 | B1 * | 2/2001 | Caronni et al. ............. | 713/163 |
| 6,295,361 | B1 * | 9/2001 | Kadansky et al. ........... | 380/278 |
| 6,889,321 | B1 * | 5/2005 | Kung et al. ................. | 713/153 |
| 7,269,728 | B1 * | 9/2007 | Li .............................. | 713/163 |
| 2002/0095586 | A1 * | 7/2002 | Doyle et al. ................ | 713/186 |
| 2002/0095587 | A1 * | 7/2002 | Doyle et al. ................ | 713/186 |
| 2002/0095601 | A1 * | 7/2002 | Hind et al. .................. | 713/201 |
| 2002/0186846 | A1 * | 12/2002 | Nyberg et al. .............. | 380/273 |
| 2003/0149874 | A1 * | 8/2003 | Balfanz et al. ............. | 713/168 |
| 2003/0159044 | A1 * | 8/2003 | Doyle et al. ................ | 713/176 |
| 2003/0210787 | A1 * | 11/2003 | Billhartz et al. ............ | 380/270 |

(Continued)

OTHER PUBLICATIONS

N. Asokan and Philip Ginzboorg "Key agreement in Ad-hoc Networks" Computer Communications, vol. 23, No. 17, Nov. 1, 2000, p. 1627-1637.*

(Continued)

*Primary Examiner*—Kimyen Vu
*Assistant Examiner*—April Y Shan
(74) *Attorney, Agent, or Firm*—Lee & Morse, P.C.

(57) ABSTRACT

A cryptographic method using dual encryption keys and a wireless local area network (LAN) system therefor includes (a) generating a first group key in N wireless terminals forming an ad-hoc group, where N is equal to or greater than two, (b) generating a second group key in a main wireless terminal to perform a key distribution center function among the N wireless terminals, and transmitting the second group key to (N−1) sub wireless terminal, and (c) encoding data using the second group key, and transmitting the encoded data between the N wireless terminals. Data security in a wireless LAN system of an ad-hoc network is increased by creating a first group key having a low frequency of use using a group password, and using a random key generation algorithm to create, distribute, and modify a second group key in a wireless terminal functioning as a key distribution center.

20 Claims, 5 Drawing Sheets

U.S. PATENT DOCUMENTS

2003/0226013 A1* 12/2003 Dutertre .................... 713/163
2003/0233538 A1* 12/2003 Dutertre .................... 713/151
2004/0015689 A1* 1/2004 Billhartz ................... 713/156

OTHER PUBLICATIONS

Bruce Schneier "Applied Cryptography" Second edition published by John Wiley & Sons, Inc 1996, p. 180 Section 8.6 "Key Updating".*

Menezes, et al. "Handbook of Applied Cryptography", CRC Press, pp. 551-553, (Oct. 1996).
"Specification of the Bluetooth System; Wireless Connections Made Easy; Profiles; v1.0B", (Dec. 1999).
Waldvogel et al, "The VersaKey . . . ", IEEE J. on Selected Areas in Communi . . . , 17(9):1614-1631 (Sep. 1999).
Wong, Chung Kei, et al., "Secure Group Communications Using Key Graphs", IEEE/ACM Transactions on Networking, vol. 8, No. 1, pp. 16-30, (Feb. 2000).

* cited by examiner

CRYPTOGRAPHIC METHOD USING DUAL ENCRYPTION KEYS AND A WIRELESS LOCAL AREA NETWORK (LAN) SYSTEM THEREFOR

BACKGROUND OF THE INVENTION

1. Field of the Invention

The present invention relates to a wireless Local Area Network (LAN) system. More particularly, the present invention relates to a cryptographic method using dual encryption keys and a wireless Local Area Network (LAN) system therefor that is capable of increasing security by encoding data using dual encryption keys consisting of first and second group keys in an ad-hoc network.

2. Description of the Related Art

Generally, a wireless Local Area Network (LAN) system includes an ad-hoc network where a plurality of terminals, each of which includes a wireless Network Interface Card (NIC), are connected to each other and independently to wired LANs, and an infrastructure network where wireless terminals are connected to wired LANs through wireless access nodes having a wireless NIC. An ad-hoc network consists of two or more wireless terminals. Contrary to the infrastructure network, the ad-hoc network does not have a fixed wireless access node for accessing other wireless terminals. If the respective wireless terminals of an ad-hoc network exist within a distance that allows communication between the terminals, the respective wireless terminals are recognized by each other as belonging to the same ad-hoc group by setting the same service set identifiers (SSIDs). If one wireless terminal is connected to the Internet, that wireless terminal is used as a server and the other wireless terminals within the same ad-hoc group share access to the Internet through that server using any sharing program of the Internet or any sharing menu of Microsoft Windows®.

Generally, an ad-hoc network is formed by specific users having a common interest. Since most information in the ad-hoc group is intended to be private, and that information is temporarily generated for specific purposes, the information does not have continuity. In addition, in an ad-hoc network, the creator of a group becomes a temporary group master and participants of the group are allowed participation permission in the group with only minimal information.

In a wireless LAN system of an ad-hoc network, transmission data is encoded, for communication security, to provide confidentiality and integrity of data. Due to the characteristics of an ad-hoc network, a cryptographic method using symmetric keys is primarily used. FIG. 1 illustrates a schematic view of a conventional cryptographic method in a wireless LAN system of an ad-hoc network.

As shown in FIG. 1, in a system using symmetric keys, all wireless terminals 11, 13, 15, 17, and 19, which constitute an ad-hoc network 10, share a group key value, wherein the group key value is set by the users. That is, all users in the ad-hoc group must know the group key value in advance of transmitting data, which causes some inconvenience. Further, although the users know the group key value in advance, the group key value must often be modified to minimize exposure of the group key value to hacking by a malicious user. Therefore, the group key value must be frequently created, distributed, and modified. However, since no apparatus provides such a function in a current ad-hoc network, the high possibility of being hacked by a malicious user poses a serious threat.

SUMMARY OF THE INVENTION

The present invention provides a cryptographic method in a wireless local area network (LAN) system of an ad-hoc network using dual encryption keys that is capable of confirming data security by creating a first group key using a group password, and then by creating, distributing, and modifying a second group key for use upon data transmission in a wireless terminal functioning as a key distribution center, using a random key generation algorithm.

The present invention also provides a wireless LAN system that is capable of strengthening security by encoding data using dual encryption keys consisting of a first and second group keys.

According to a feature of the present invention, there is provided a cryptographic method using dual keys in a wireless local area network (LAN) system, including (a) generating a first group key in N wireless terminals forming an ad-hoc group, where N is equal to or greater than two; (b) generating a second group key in a main wireless terminal to perform a key distribution center function among the N wireless terminals, and transmitting the second group key to (N−1) sub wireless terminals; and (c) encoding data using the second group key, and transmitting the encoded data between the N wireless terminals.

Preferably, when the main wireless terminal is withdrawn from the ad-hoc group, the main wireless terminal transfers a key distribution center function to a sub wireless terminal selected from among the (N−1) sub wireless terminals, so that the sub wireless terminal acts as the main wireless terminal.

The cryptographic method may further include modifying the second group key in the main wireless terminal according to a predetermined modification time period, and transmitting the modified second group key to the (N−1) sub wireless terminals.

According to another feature of the present invention, there is provided a computer readable medium having embodied thereon a computer program for the above cryptographic method using the dual encryption keys in a wireless LAN system.

According to still another feature of the present invention, there is provided a wireless local area network (LAN) system comprising: N, where N is equal to or greater than two, wireless terminals which form an ad-hoc group, and create a first group key, wherein the N wireless terminals include: a main wireless terminal for performing a key distribution center function in the ad-hoc group, for creating a second group key and encoding data using the second group key, and for transmitting the encoded data between the remaining wireless terminals; and (N−1) sub wireless terminals for receiving the second group key from the main wireless terminal and encoding data using the second group key, and for transmitting the encoded data between the remaining wireless terminals.

BRIEF DESCRIPTION OF THE DRAWINGS

The above and other features and advantages of the present invention will become more apparent to those of ordinary skill in the art by describing in detail preferred and exemplary embodiments thereof with reference to the attached drawings in which.

DETAILED DESCRIPTION OF THE INVENTION

Korean Patent Application No. 2002-39156, filed on Jul. 6, 2002, and entitled: "Cryptographic Method Using Dual Encryption Keys and Wireless Local Area Network (LAN) System Therefor," is incorporated by reference herein in its entirety.

The present invention will now be described more fully hereinafter with reference to the accompanying drawings, in which preferred and exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 1:
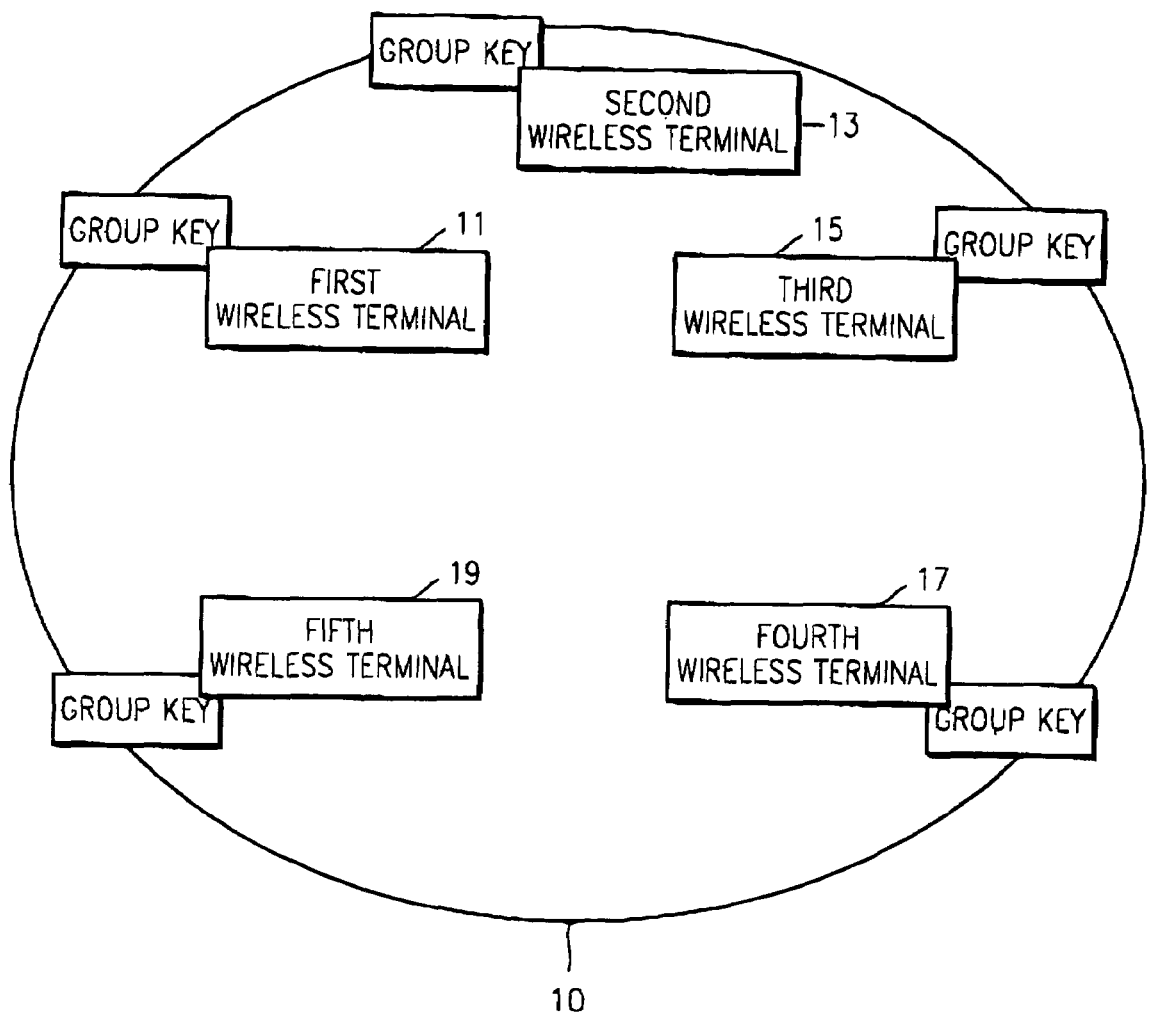
FIG. 1 illustrates a schematic view of a conventional cryptographic method in a wireless local area network (LAN) system of an ad-hoc network.
Figure 2:
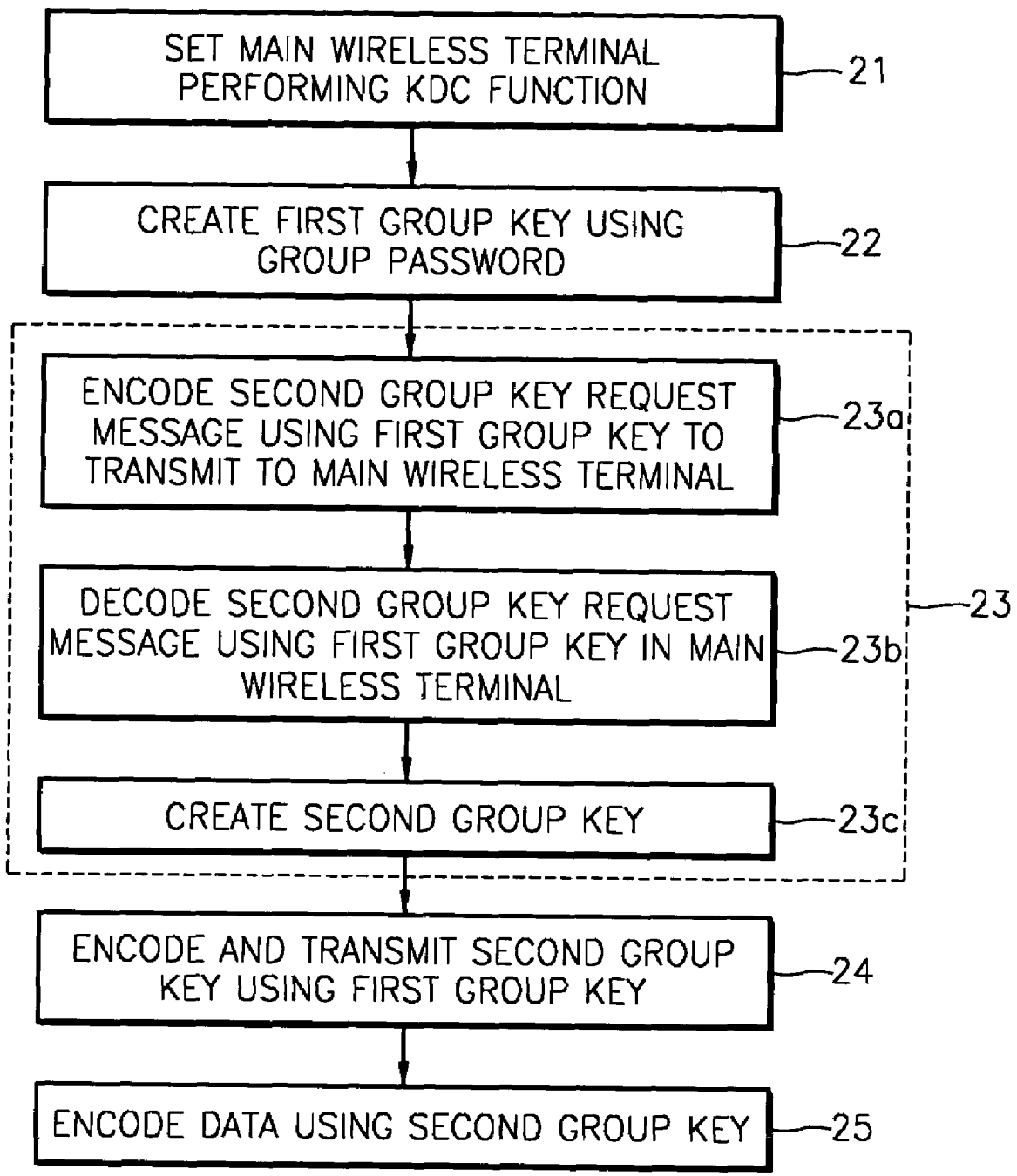
FIG. 2 is a flow chart illustrating a cryptographic method using dual encryption keys in a wireless LAN system of an ad-hoc network, according to a preferred embodiment of the present invention.

FIG. 2 is a flow chart illustrating a cryptographic method using dual encryption keys in a wireless LAN system of an ad-hoc network, according to a preferred embodiment of the present invention. The present cryptographic method includes, in step 21, setting a main wireless terminal, in step 22, creating a first group key, in step 23, creating a second group key, in step 24, transmitting the second group key, and, in step 25, transmitting data.

Referring to FIG. 2, in step 21, among N (where N is preferably an integer equal to or greater than two) wireless terminals forming an ad-hoc group, a main wireless terminal functions as a key distribution center (KDC). Initially, the creator of the ad-hoc group is set as the main wireless terminal in order to function as the key distribution center. When the main wireless terminal is withdrawn from the ad-hoc group, the main wireless terminal is able to transfer the key distribution center function to another wireless terminal selected from among the (N−1) wireless terminals remaining in the ad-hoc group.

Successively, in step 22, a first group key (LSK) is created using a group password in the N wireless terminals. Then, in step 23, a second group key (SSK1) is created in the main wireless terminal for use in transmitting data between wireless terminals. The process of creating the second group key (SSK1) in step 23 will now be described in greater detail. After the creation of the first group key in step 22, in step 23a, a second group key request message from respective wireless terminals is encoded with the first group key and is transmitted to the main wireless terminal. In step 23b, the second group key request message is decoded in the main wireless terminal using the first group key. Then, in step 23c, a second group key (SSK1) is created in the main wireless terminal, according to the decoded message. In the above process, the first and second group keys may be created using a general key generation algorithm.

Subsequently, in step 24, the second group key (SSK1), which was created in the main wireless terminal, is encoded with the first group key and is transmitted to the (N−1) wireless terminals in the ad-hoc network. Then, in step 25, data is encoded using the second group key and is transmitted between the N wireless terminals.

Figure 3:
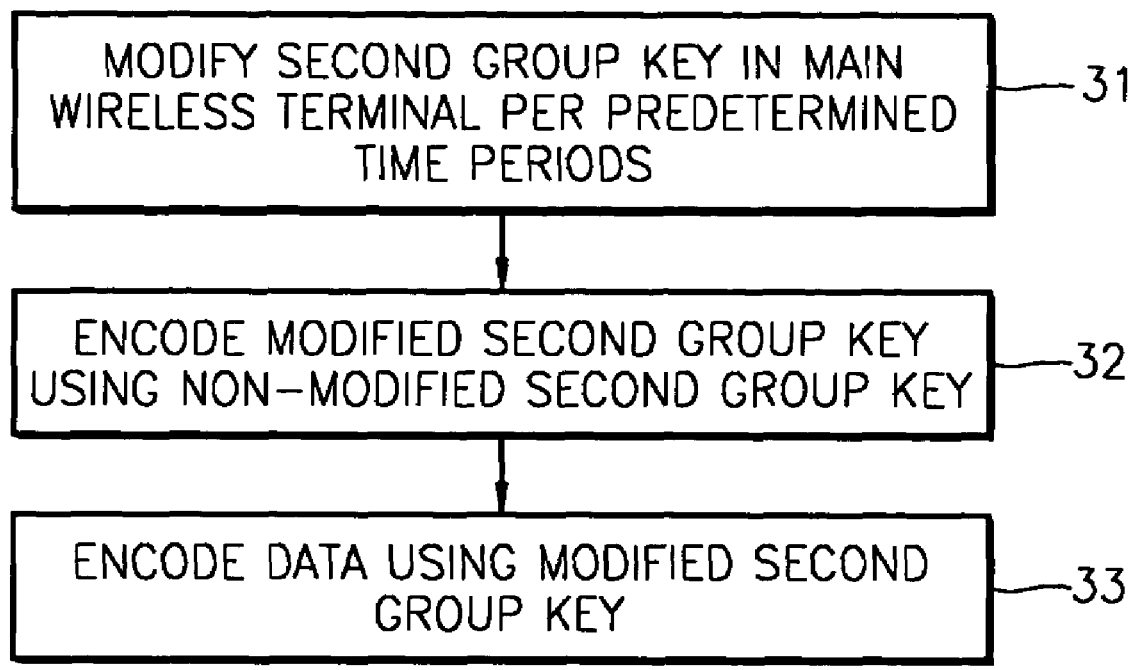
FIG. 3 is a flow chart illustrating a method of modifying a second group key, according to an embodiment of the present invention.

FIG. 3 is a flow chart illustrating a method of modifying a second group key, according to an embodiment of the present invention. First, if a modification time period is predetermined in the main wireless terminal, in step 31, a second group key (SSK1) is modified according to the predetermined modification time period. This second group key modification may be performed using a general key generation algorithm, as in step 23 of FIG. 2. Then, in step 32, the modified second group key (SSK2), which was modified in the main wireless terminal, is encoded using the non-modified second group key (SSK1), and is transmitted to the (N−1) wireless terminals in the ad-hoc network. The modified second group key (SSK2) transmitted from the main wireless terminal is then decoded using the non-modified second group key (SSK1), so that, in step 33, the decoded modified second group key (SSK2) can be used as the encryption key in transmitting data between respective wireless terminals.

By modifying a second group key according to a predetermined modification time period, a second group key generated from a main wireless terminal is used only during a predetermined time period, and is discarded after the time period expires. This is intended to limit the ability of a would-be hacker to analyze passwords or to detect the second group keys stored in each wireless terminal.

Figure 4:
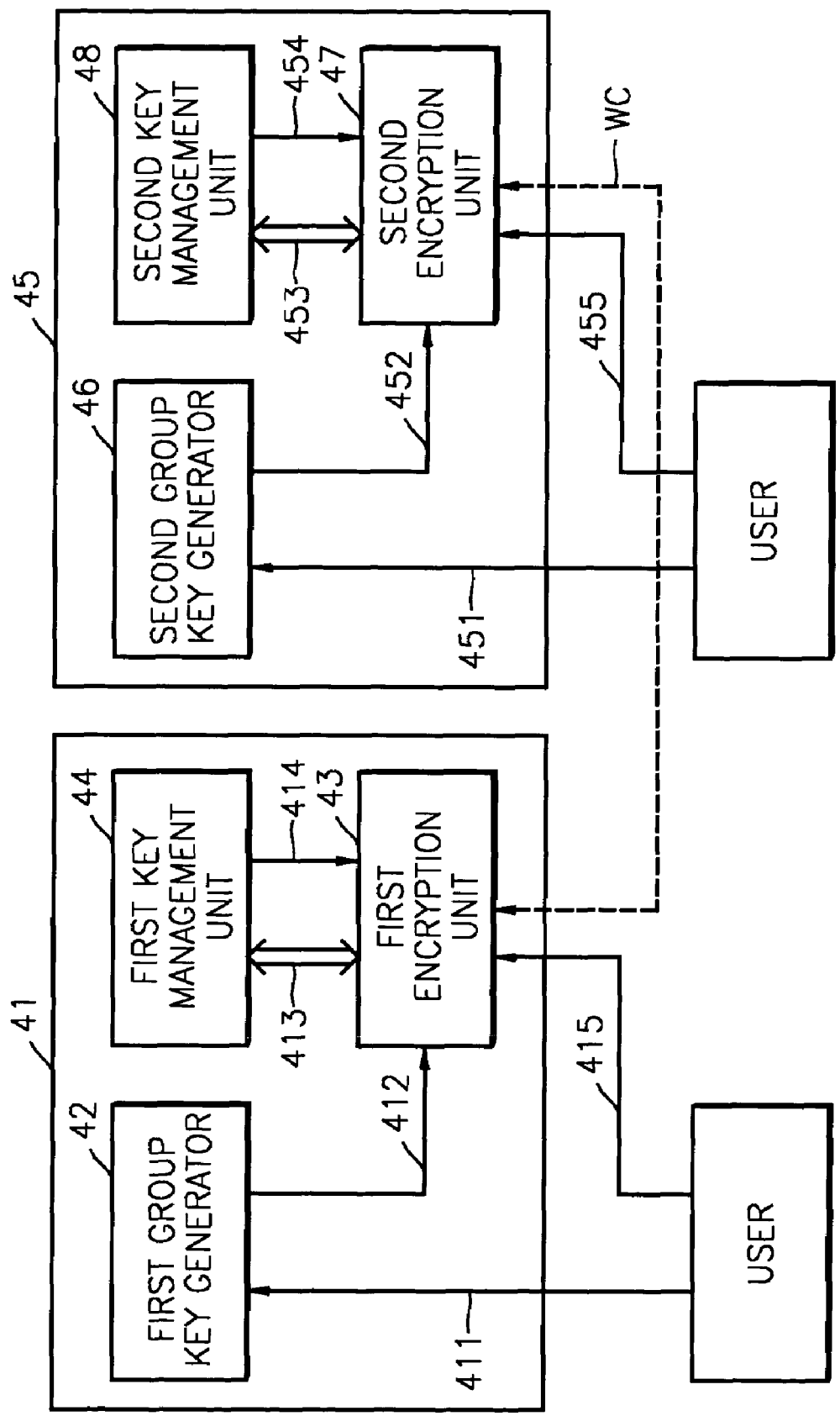
FIG. 4 is a block diagram showing a wireless LAN system of an ad-hoc network, according to a preferred embodiment of the present invention.

FIG. 4 is a block diagram showing a wireless LAN system of an ad-hoc network, according to an embodiment of the present invention. One ad-hoc group includes N wireless terminals, generally including, a main wireless terminal 45, which functions as a key distribution center, and (N−1) sub wireless terminals 41, wherein N is preferably an integer equal to or greater than two.

The sub wireless terminal 41 includes a first group key generator 42, a first encryption unit 43, and a first key management unit 44. The main wireless terminal 45 includes a second group key generator 46, a second encryption unit 47, and a second key management unit 48. Initially, a main wireless terminal 45 is set as the creator of an ad-hoc group. However, when the main wireless terminal 45 is withdrawn from the ad-hoc group, the main wireless terminal is able to transfer a key distribution center function to another wireless terminal selected from among the (N−1) wireless terminals remaining in the ad-hoc group. Accordingly, each of the remaining wireless terminals 41 constituting the ad-hoc group, as well as the original main wireless terminal 45, must have the ability to function as a key distribution center.

Figure 5:
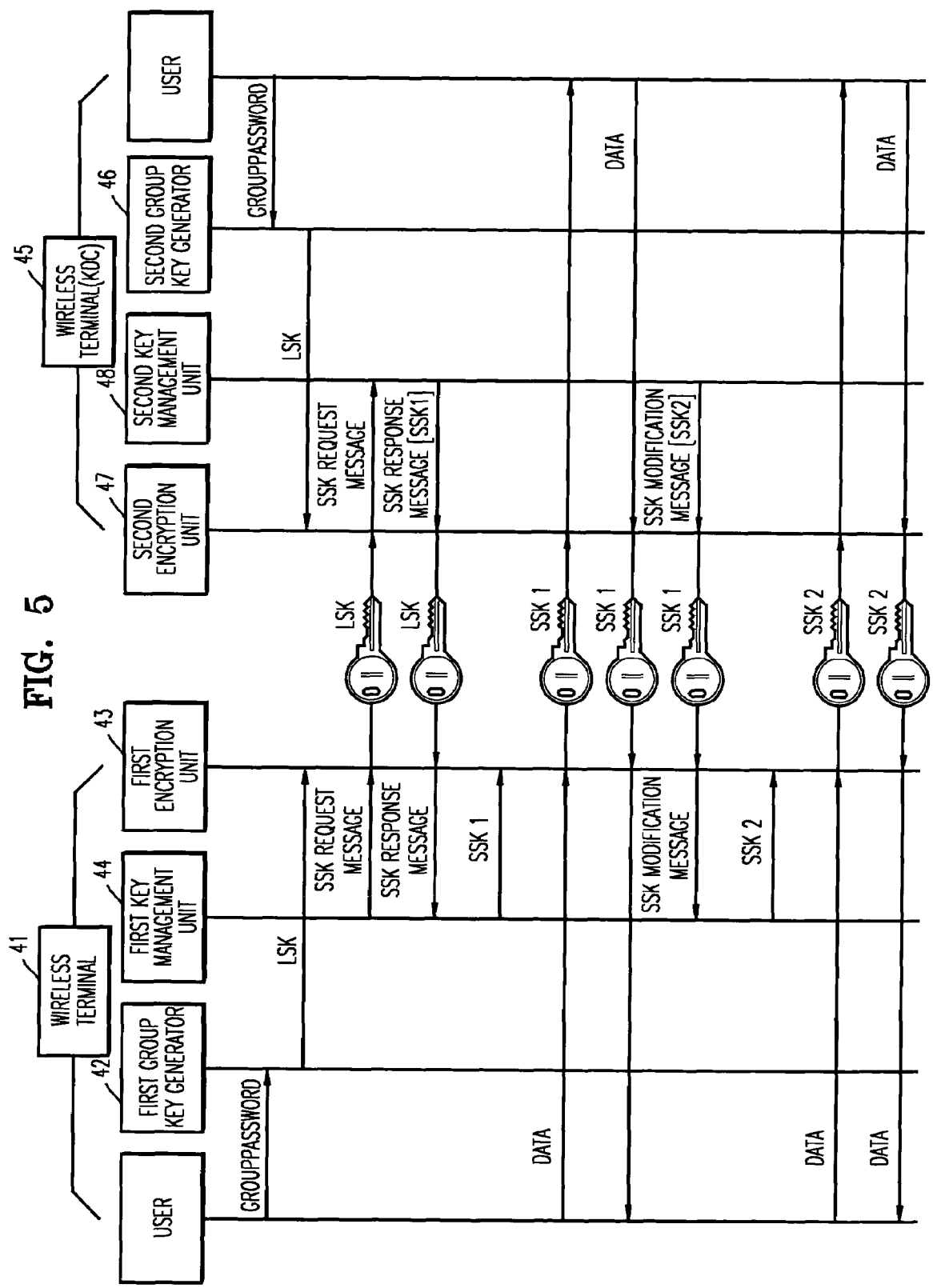
FIG. 5 illustrates a schematic view of the operational relationships of the components of FIG. 4.

Now, operations of the wireless LAN system of the ad-hoc network will be described sequentially in connection with FIG. 5. FIG. 5 illustrates a schematic view of the operational relationships of the components of FIG. 4.

With reference to FIGS. 4 and 5, a first group key generator 42 of a sub wireless terminal 41 creates a first group key (LSK) 412 using a group password 411 input from a user, and outputs the first group key (LSK) 412 to a first encryption unit 43. Similarly, a second group key generator 46 of a main wireless terminal 45 creates a first group key (LSK) 452 using a group password 451 input from a user, and outputs the first group key (LSK) 452 to a second encryption unit 47. The first group keys (LSK) 412 and 452 can be created using a general key generation algorithm.

If a first key management unit 44 recognizes that the first group key (LSK) 412 has been created in the first group key generator 42, the first key management unit 44 generates a second group key (SSK1) request message 413. The generated second group key (SSK1) request message 413 is supplied to the first encryption unit 43.

The first encryption unit 43 stores the first group key (LSK) 412 supplied from the first group key generator 42, receives the second group key (SSK1) request message 413 generated from the first key management unit 44, encodes the second group key (SSK1) request message 413 using the stored first group key (LSK) 412, and transmits the encoded result to the second encryption unit 47 of the main wireless terminal 45 through a wireless channel WC.

In FIGS. 4 and 5, reference numeral 413 represents any one of a series of messages communicated between the first key management unit 44 and the first encryption unit 43. Reference numeral 414 represents any one of a series of group keys communicated to the first encryption unit 43 from the first key management unit 44. Similarly, reference numeral 453 represents any one of a series of messages communicated between the second key management unit 48 and the second encryption unit 47. Reference numeral 454 represents any one of a series of group keys communicated to the second encryption unit 47 from the second key management unit 48.

In the main wireless terminal 45, the second encryption unit 47 stores the first group key (LSK) 452 supplied from the second group key generator 46, decodes the encoded second group key (SSK1) request message transmitted from the sub wireless terminal 41 using the first group key (LSK) 452, and transmits the decoded message 453 to the second key management unit 48.

The second key management unit 48 receives the second group key request (SSK1) message 453 decoded by the second encryption unit 47, creates a second group key (SSK1), and supplies a second group key (SSK1) response message 453, which includes the created second group key (SSK1) 454, to the second encryption unit 47. The second group key (SSK1) 454 may also be created using a general random key generation algorithm. The second encryption unit 47 encodes the second group key (SSK1) response message 453 using the first group key (LSK) 452 and transmits the encoded result to the first encryption unit 43 through a wireless channel WC.

In the sub wireless terminal 41, the first encryption unit 43 decodes the encoded second group key (SSK1) response message, transmitted from the main wireless terminal 45, using the first group key (LSK) 412 and transmits the decoded message 413 to the first key management unit 44. The first key management unit 44 extracts the second group key (SSK1) 414 from the decoded message 413 and supplies the extracted second group key (SSK1) 414 to the first encryption unit 43. The first encryption unit 43 encodes data 415 input from a user, using the second group key (SSK1) 414, and transmits the encoded result. Similarly, in the main wireless terminal 45, the second encryption unit 47 encodes data 455 input from a user, using the second group key (SSK1) 454, and transmits the encoded result.

The second key management unit 48 of the main wireless terminal 45 predetermines a constant modification time period, creates a modified second group key (SSK2), which is modified according to the predetermined modification time period, using a random key generation algorithm, and supplies a second group key (SSK2) modification message 453, which includes the modified second group key (SSK2) 454, to the second encryption unit 47. The second encryption unit 47 encodes the second group key (SSK2) modification message 453, using the non-modified second group key (SSK1), and transmits the encoded result to the first encryption unit 43 through a wireless channel WC.

The first encryption unit 43 decodes the encoded second group key (SSK2) modification message, using the non-modified second group key (SSK1), and supplies the decoded message 413 to the first key management unit 44. The first key management unit 44 extracts the modified second group key (SSK2) from the decoded second group key (SSK2) modification message 413, and supplies the extracted second group key (SSK2) 414 to the first encryption unit 43. The first encryption unit 43 encodes data 415 input from a user, using the second group key (SSK2) 414, and transmits the encoded result. Similarly, in the main wireless terminal 45, the second encryption unit 47 encodes data 455 input from a user, using the second group key (SSK2) 454, and transmits the encoded result.

The above-described preferred and exemplary embodiments of the present invention may be embodied as computer programs and may also be embodied in a general-purpose digital computer for executing the computer programs using a computer readable medium. The computer readable medium may include storage media, such as magnetic storage media (e.g. ROMs, floppy discs, hard discs, etc.), and optically readable media (e.g. CD-ROMs, DVDs, etc.).

As described above, according to the preferred and exemplary embodiments of the present invention, it is possible to increase users' convenience in a wireless LAN system of an ad-hoc network by easily creating a first group key using a group password. Further, the inconvenience regarding key management in a symmetric-key algorithm can be overcome by using a random key generation algorithm to create, distribute, and modify a second group key for use upon data transmission in a wireless terminal functioning as a key distribution center.

In addition, since the first group key has a low frequency of use and the second group key is modified at predetermined time intervals, the chance of an unwanted decryption by a malicious user is reduced, thereby increasing and verifying data security within a group.

In addition, it is possible to continuously perform key management, i.e., creation, distribution, and modification of a second group key, by allowing the wireless terminal that is the creator of the ad-hoc group to function as a key distribution center and to transfer that key distribution center function to another wireless terminal when the wireless terminal that has functioned as the key distribution center is withdrawn from the ad-hoc network.

Preferred and exemplary embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A cryptographic method using dual keys in a wireless local area network (LAN) system, comprising:
   (a) generating a first group key in N wireless terminals forming an ad-hoc group, where N is equal to or greater than two;
   (b) generating an initial second group key in a main wireless terminal to perform a key distribution center function among the N wireless terminals in response to a request from one of (N−1) sub wireless terminals, the request being communicated using the first group key, and transmitting the initial second group key to (N−1) sub wireless terminals;

(c) encoding data using the initial second group key, and transmitting the encoded data between the N wireless terminals;

(d) modifying the initial second group key in the main wireless terminal according to a modification time period to form at least one modified second group key, the modification time period being predetermined in the main wireless terminal; and (e) transmitting the at least one modified second group key to the (N−1) sub wireless terminals, wherein the at least one modified second group key is transmitted and used to encode data between the N wireless terminals during use of the first group key, wherein in (e), the at least one modified second group key is encoded using the initial second group key, the method further comprising transmitting the encoded modified second group key to the (N−1) sub wireless terminals, wherein in (b), the main wireless terminal encodes the initial second group key using the first group key, and transmits the encoded initial second group key to the (N−1) wireless terminals.

2. The method as claimed in claim 1, wherein the first group key is generated using a group password of the ad-hoc group.

3. The method as claimed in claim 1, wherein the main wireless terminal is a creator of the ad-hoc group.

4. The method as claimed in claim 1, wherein when the main wireless terminal is withdrawn from the ad-hoc group, the main wireless terminal transfers the key distribution center function to a sub wireless terminal selected from among the (N−1) sub wireless terminals, so that the sub wireless terminal acts as the main wireless terminal.

5. The method as claimed in claim 1, wherein (b) comprises:

(b1) when the first group key is created, encoding a second group key request message from one of the (N−1) sub wireless terminals, and transmitting the encoded second group key request message to the main wireless terminal;

(b2) decoding the second group key request message, using the first group key, in the main wireless terminal; and (b3) creating the initial second group key according to the decoded second group key request message, in the main wireless terminal.

6. A non-transitory computer readable medium having embodied thereon a computer program for the method according to claim 1.

7. A non-transitory computer readable medium having embodied thereon a computer program for the method according to claim 4.

8. A non-transitory computer readable medium having embodied thereon a computer program for the method according to claim 5.

9. A wireless local area network (LAN) system, comprising:

N, where N is equal to or greater than two, wireless terminals which form an ad-hoc group, and create first and second group keys, wherein the N wireless terminals include:

a main wireless terminal for performing a key distribution center function in the ad-hoc group, for creating an initial second group key in response to a request from one of (N−1) sub wireless terminals, the request being communicated using the first group key, and encoding data using the initial second group key, and for transmitting the encoded data between the remaining wireless terminals; and (N−1) sub wireless terminals for generating a first group key and for receiving the initial second group key from the main wireless terminal and encoding data using the initial second group key, and for transmitting the encoded data between the remaining wireless terminals, wherein the main wireless terminal modifies the initial second group key according to a modification time period to form at least one modified second group key, the modification time period being predetermined in the main wireless terminal;

wherein the main wireless terminal transmits the at least one modified second group key to each of the (N−1) sub wireless terminals, the at least one modified second group key being transmitted and used to encode data between the N wireless terminals during use of the first group key;

wherein the main wireless terminal encodes the initial second group key using the first group key, and transmits the encoded initial second group key to the (N−1) wireless terminals; and wherein the main wireless terminal encodes the at least one modified second group key using the initial second group key, and transmits the encoded modified second group key to the (N−1) sub wireless terminals.

10. The system as claimed in claim 9, wherein the first group key is generated using a group password of the ad-hoc group.

11. The system as claimed in claim 9, wherein the main wireless terminal is a creator of the ad-hoc group.

12. The system as claimed in claim 9, wherein when the main wireless terminal is withdrawn from the ad-hoc group, the main wireless terminal transfers the key distribution center function to a sub wireless terminal selected from among the (N−1) sub wireless terminals, so that the sub wireless terminal acts as the main wireless terminal.

13. The system as claimed in claim 9, wherein each sub wireless terminal comprises:

a first group key generator for creating the first group key using a group password input from a user;

a first encryption unit for storing the first group key, for encoding a second group key request message using the first group key, for decoding a second group key response message from the main wireless terminal using the first group key, and for encoding data input from a user using the modified second group key; and a first key management unit for generating the second group key request message to output to the first encryption unit, for extracting the initial second group key from the second group key response message decoded in the first encryption unit, and for outputting the extracted initial second group key to the first encryption unit.

14. The system as claimed in claim 13, wherein the main wireless terminal comprises:

a second group key generator for creating the first group key using a group password input from a user;

a second encryption unit for storing the first group key, for decoding the second group key request message transmitted from the sub wireless terminal using the first group key, for encoding the second group key response message for transmitting to the sub wireless terminal using the first group key, and for encoding data input from a user using the initial second group key; and a second key management unit for receiving the second group key request message decoded from the second encryption unit, for creating the initial second group key, and for outputting the second group key response message including the created initial second group key to the second encryption unit.

15. The system as claimed in claim 14, wherein the second encryption unit encodes the modified second group key using the initial second group key, and transmits the encoded modified second group key to each of the (N−1) sub wireless terminals.

16. A wireless terminal using dual keys for cryptography, the wireless terminal for performing a key distribution center function in an ad-hoc group including other wireless terminals, the wireless terminal comprising:

first means for creating an initial second group key in accordance with a first group key, for encoding data using the initial second group key, for transmitting the encoded data between the other wireless terminals, for modifying the initial second group key according to a predetermined modification time period to form at least one modified second group key, and for transmitting the at least one modified second group key to at least one wireless terminal, wherein the at least one modified second group key is transmitted and used to encode data during use of the first group key, wherein the wireless terminal encodes the initial second group key using the first group key, and transmits the encoded initial second group key to the other wireless terminals; and wherein the wireless terminal encodes the at least one modified second group key using the initial second group key, and transmits the encoded modified second group key to other wireless terminals.

17. The wireless terminal as claimed in claim 16, wherein the first means comprises:

a group key generator for creating the first group key;

an encryption unit for encoding a second group key response message corresponding to a second group key request message transmitted from the at least one wireless terminal using the first group key, for transmitting the encoded second group key response message to the at least one wireless terminal, and for encoding data input from a user using the modified second group key; and a key management unit for receiving the second group key request message, for creating the initial second group key, for outputting the second group key response message including the created initial second group key to the encryption unit, and for modifying the initial second group key according to the predetermined modification time period.

18. A wireless terminal using dual keys for cryptography, the wireless terminal comprising:

first means for creating a first group key, for receiving an initial second group key communicated using the first group key and a modified second group key, communicated using the initial second group key from another wireless terminal performing a key distribution center function in an ad-hoc group, for encoding data using the modified second group key, and for transmitting the encoded data between wireless terminals existing in the ad-hoc group, wherein the initial second group key is modified in the other wireless terminal performing the key distribution center according to a predetermined modification time period to form the at least one modified second group key, wherein at least one modified second group key is transmitted and used to encode data during use of the first group key, wherein the wireless terminal encodes the initial second group key using the first group key, and transmits the encoded initial second group key to the other wireless terminals; and wherein the wireless terminal encodes the at least one modified second group key using the initial second group key, and transmits the encoded modified second group key to the other wireless terminals.

19. The wireless terminal as claimed in claim 18, wherein the first means comprises:

a group key generator for creating the first group key;

an encryption unit for encoding a second group key request message using the first group key, for decoding a second group key response message using the first group key, and for encoding data input from a user using the modified second group key; and a key management unit for generating the second group key request message to output to the encryption unit, for extracting the initial second group key from the decoded group key response message, and for outputting the extracted initial second group key to the encryption unit.

20. The wireless terminal as claimed in claim 17, wherein the encryption unit encodes the at least one modified second group key using the initial second group key, and transmits the encoded modified second group key to the at least one wireless terminal via the encryption unit.

* * * * *